Dec. 18, 1951 G. HECHT 2,578,701

COORDINATE SELECTING AND LOCKOUT CIRCUIT

Filed Sept. 15, 1949 3 Sheets-Sheet 1

INVENTOR
G. HECHT
BY
William F. Simpson
ATTORNEY

Dec. 18, 1951 G. HECHT 2,578,701

COORDINATE SELECTING AND LOCKOUT CIRCUIT

Filed Sept. 15, 1949 3 Sheets-Sheet 2

INVENTOR
G. HECHT
BY
William F. Simpson
ATTORNEY

INVENTOR
G. HECHT
BY William F. Simpson
ATTORNEY

Patented Dec. 18, 1951

2,578,701

UNITED STATES PATENT OFFICE 2,578,701

COORDINATE SELECTING AND LOCKOUT CIRCUIT

George Hecht, Astoria, N. Y., assignor to Bell Telephone Laboratories, Incorporated, New York, N. Y., a corporation of New York Application September 15, 1949, Serial No. 115,823

6 Claims. (Cl. 179—18)

This invention relates to improved interconnecting, selecting, and lock-out control circuits for coordinate switching arrangements.

An object of the invention is to provide arrangements operating at high speed and with greater accuracy than heretofore for interconnecting individually any one of a plurality of devices, circuits or paths to any one of another plurality of other devices, circuits or paths.

More specifically, this invention relates to an improvement of the interconnecting, selecting and lock-out control circuits disclosed in my copending application Serial No. 90,001, filed on or about April 27, 1949, now Patent No. 2,532,718, granted December 5, 1950.

In arrangements of this type, any one or more of each of a first group of devices, circuits or paths may be simultaneously conditioned for connection with any one of the devices, circuits or paths of a second group.

The second group of devices are normally not conditioned for connection but any number of them may be individually and simultaneously or individually and in succession conditioned for connection with any one of the devices, circuits or paths of the first group.

A feature of this invention relates to an interconnecting, selecting and lock-out arrangement in which two or more independent connections may be simultaneously established through the switching apparatus in such a manner that no double connections can occur.

The present circuit arrangement is provided to permit an individual connection to be established from any one of the first devices to any one of the second group of devices in such a manner that no double connections occur even though the devices of the second group are simultaneously conditioned for connection to the devices, circuits or paths of the other group.

In accordance with an exemplary embodiment of the invention, a switching network is provided in which a plurality of switching devices, relays or other interconnecting means are arranged in a coordinate array or matrix and the individual devices of one group individually associated with one of the coordinates of the array such as the rows or abscissa and each of the devices of the other group individually associated with the other coordinate such as the ordinates or vertical columns. At each of the cross-points, a relay or other switching device is provided for interconnecting the two devices associated with a respective row and column to which the relay is common.

In accordance with the present invention, a cold cathode gas discharge tube is provided at each of the cross-points to control the operation of the relays located thereat. One set of tubes at each of the cross-points is arranged in a lock-out circuit in accordance with one of the coordinates while the other tube is arranged in the lock-out circuit in accordance with the other coordinate of the cross-point. Furthermore, when one of the tubes of one of the coordinates becomes energized, it will condition the tube in the other coordinate for energization. Thus, it is possible to interconnect only one of the devices, circuits or paths of the first group with one of the devices, circuits or paths of the other group. However, more than one of such connections may be established at any given time providing they involve different coordinates for both of the devices.

A feature of this invention relates to circuit arrangements for dividing the cross-points of one coordinate into different subgroups and thus dividing the tubes associated with these cross-points into different subgroups in which the tubes of the various subgroups are given different orders of preference over the tubes of other subgroups so that the traffic load may be more evenly distributed between the various devices of the various groups.

Another feature of this invention relates to apparatus responsive to an established connection between one of the devices, circuits or paths of the first group and one of the devices, circuits or paths of the second group for rendering the control tubes of both coordinates of the operating relay incapable of further operation or ionization so long as the two circuits are interconnected. However, other circuits may be established between the individual devices, circuits or paths of the two groups.

In accordance with a specific embodiment of the invention, an additional cold cathode gas discharge tube is associated with one of the coordinates of the array and energized when any cross-point of the associated coordinate is closed and serves to prevent operation of any of the other tubes of that coordinate of the array. Such a tube is fast in operating and individually effectively short-circuits the input to the other tubes of the coordinate and thus prevents their subsequent energization so long as the control tube is conducting.

In accordance with a specific embodiment of the invention, a multielement gas discharge tube is employed having a residual gas at low pressure such as argon, neon or other inert gas or other gases or vapors, or combinations or mixtures thereof.

The tubes are provided with a control or discharge initiating gap of the group of electrodes, one of which is called the control anode and the other the control cathode. In addition, a main discharge path is provided between a main anode and a main cathode. The potential supplied to the tube as well as the structure and the relative positions of the electrodes are such that it requires an appreciably higher voltage to initiate a discharge across the main gap of the tube than it does across the control gap of the tube. A higher voltage is also required to initiate a discharge of current through the tube than is required to maintain the discharge current flowing through the tube. Upon the initiation of a discharge across the control gap of the tube under proper circumstances, the discharge may be readily transferred to the main gap. However, the transfer is arranged to take place in two steps. The discharge must be first initiated between the control gap anode and cathode. The discharge must then transfer to the path between the main anode and the control gap cathode and then to the path between the main gap anode and the main gap cathode. Lock-out circuits are provided to permit the transfer from the control gap to the path between the main anode and the control cathode in one tube only. Consequently, the discharge may be further transferred to this main gap of one tube only.

In the exemplary embodiment of the invention set forth herein, it has been assumed that the coordinate switching array or matrix is to be employed in an automatic telephone switching system of the type set forth in United States patents to Carpenter, 2,089,921, August 10, 1937 and 2,235,803, March 18, 1941, wherein it is desirable that certain stages of the building up of a connection between a calling and a called subscriber to interconnect a sender and a marker. These two devices are complicated control circuits and devices, each comprising a large plurality of relays and switching devices. When it is desired to interconnect a sender and a marker, it is immaterial which sender becomes interconnected to a given marker at any given time in the process of establishing a given connection through the system. But it is undesirable to have two senders connected to one marker or two markers connected to one sender.

It is also desirable to permit as many different senders to be connected to a corresponding plurality of markers simultaneously or in rapid succession as may be required or as may be provided. The interconnecting arrangements incorporating this invention and the mode of operation and interaction of the circuits and tubes thereof, may be readily understood from the following description when read with reference to the accompanying drawings in which.

Figure 1:
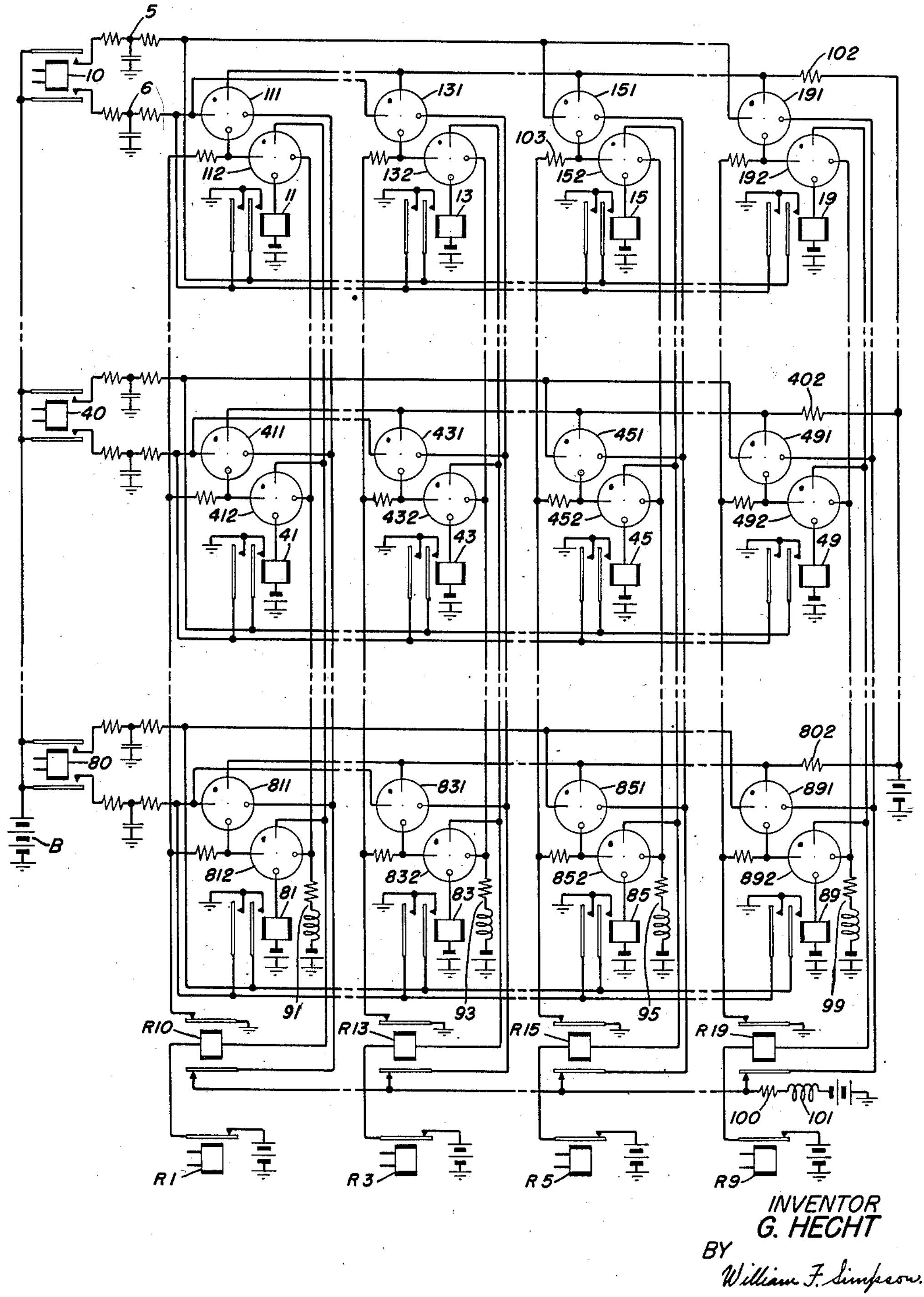
Fig. 1 shows in detail the elements of an exemplary group of tubes in array employed in a coordinate lock-out circuit arrangement.
Figure 3:
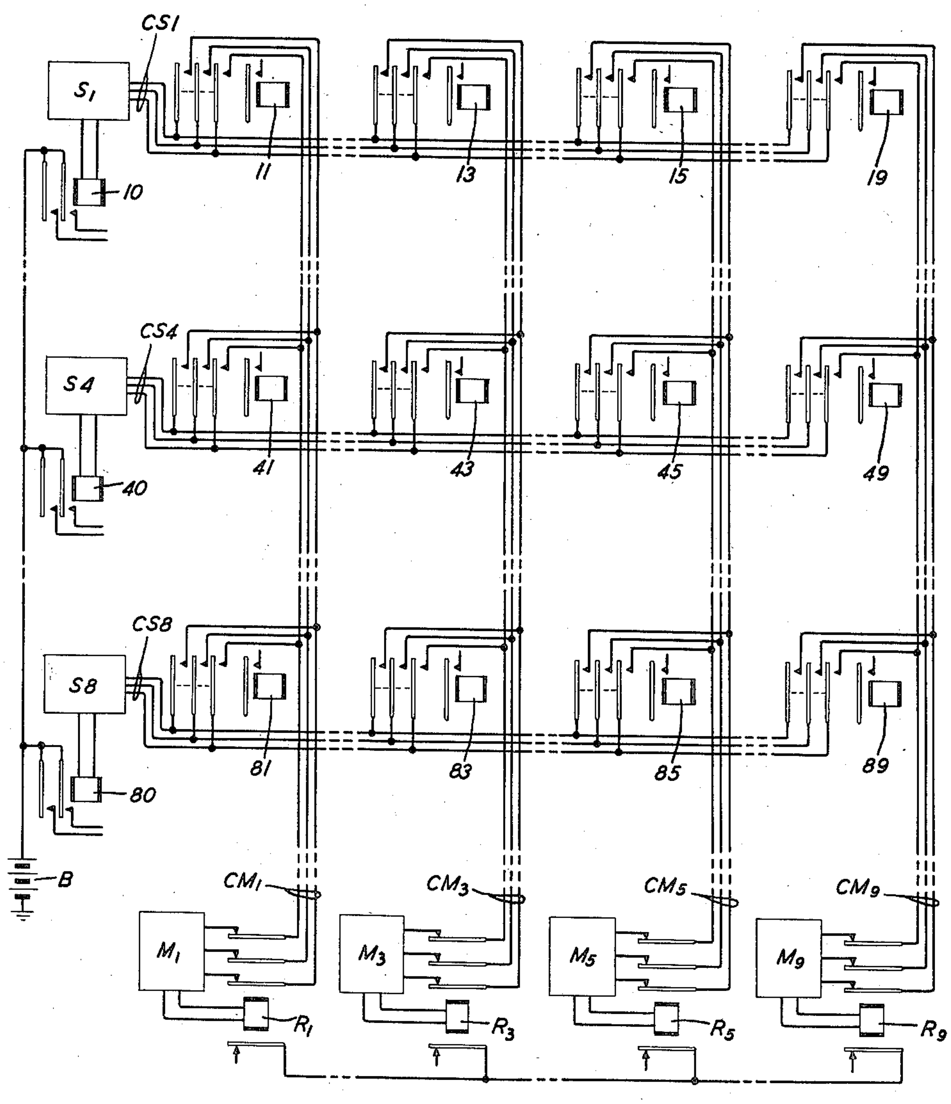
Fig. 3 shows the manner in which the various senders are interconnected to the various markers in response to the operation of the tubes and the relays shown in Fig. 1.

Referring first to Fig. 3, a group of markers are indicated by the rectangles M1, M3, M5, M9, etc. These markers control associated relays R1, R3, R5, R9, etc., inclusive, which relays are normally released when the markers are idle so that the break contacts of these relays are normally closed and connect battery through them to the switching circuits indicating that these markers are idle and available for selection. These break contacts are also illustrated in Fig. 1 as the contacts of relays R1, R3, R5, R9, etc., at the bottom of Fig. 1. Thus, these contacts are normally closed so that positive battery is normally applied to the main anodes of each of the lower groups of tubes in each horizontal level.

A group of senders S1, S4, and S8 is also shown in Fig. 3 and these senders control corresponding relays 10, 40 or 80. The relays 10, 40, 80 are normally released. When a sender desires to be connected to a marker to aid in the establishment of a connection through a dial telephone system, the corresponding relays 10, 40, or 80 will be operated which in turn applies voltage from battery B to two leads extending to the tubes of Figs. 1 and 2. Relays 10, 40 and 80 are also shown in both Figs. 1, 2 and 3.

As shown in Fig. 3, more markers are provided than senders. However, it is to be understood that any suitable number of markers or senders may be provided and in the usual telephone switching system more senders are frequently provided than markers because the sender holding time is greater than the marker holding time per call. Consequently, more senders are required to handle a given volume of traffic.

In order for one sender to be connected to one marker it is essential that some one of the relays 11 to 19, 41 to 49, and 81 to 89 will be operated. As shown in Fig. 3, these relays are arranged in a coordinate array or matrix and the senders connected to the group of cables CS1, CS4, CS8, etc. Likewise, the markers are connected to the group of conductor cables CM1, CM2, CM5, CM9, etc.

Figure 2:
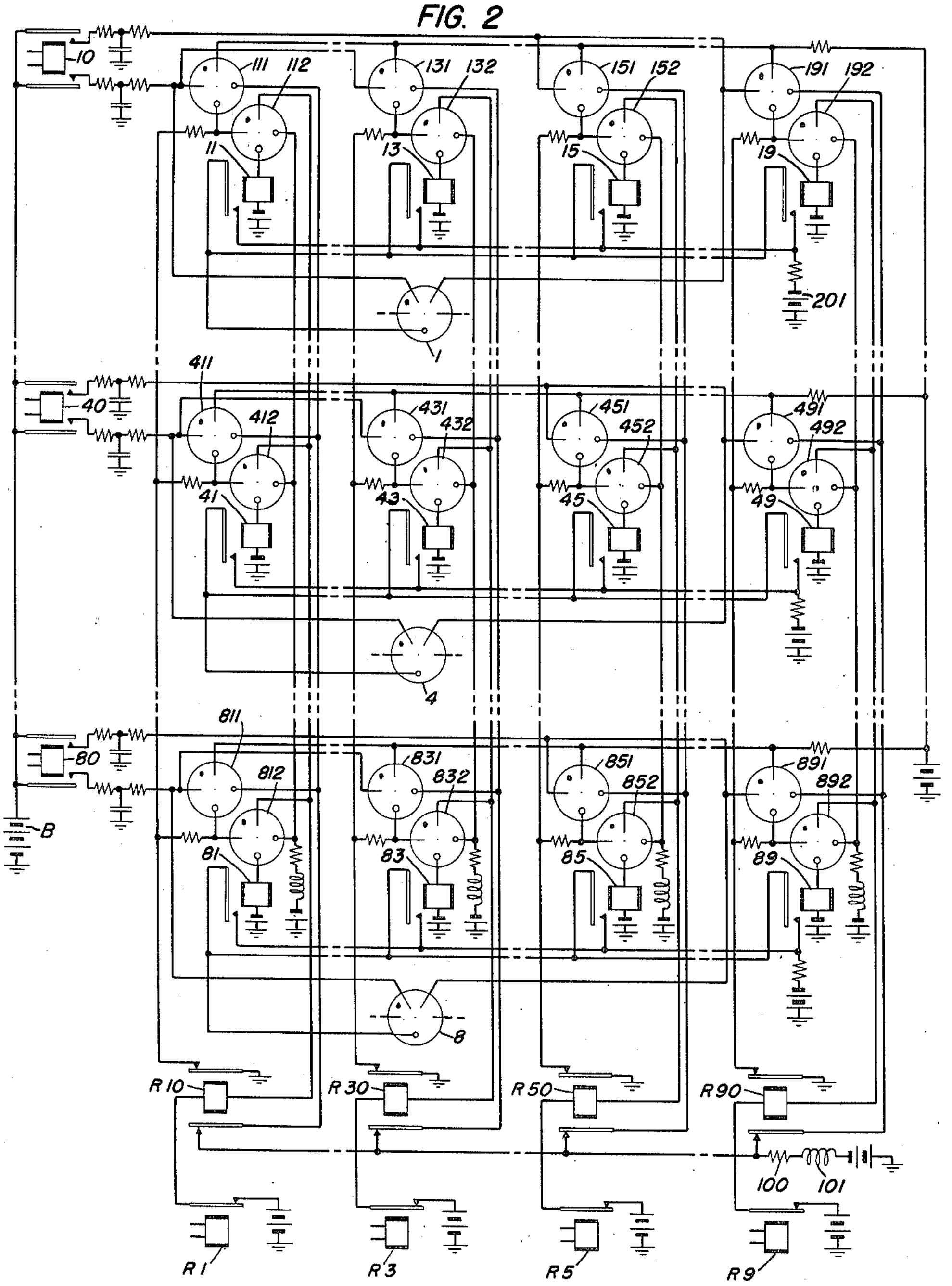
Fig. 2 shows an improved modified arrangement in which an auxiliary tube is employed to prevent improper operation of the interconnecting arrangement.

The operation of any one of the relays of the array will connect all of the conductors of one of the CS cables to the corresponding conductors of the CM cable. These groups of conductors or cables are represented in Fig. 3 by three line conductors. It is to be understood, however, that any suitable number of conductors will be included in each of these cables and that in the usual system these cables will comprise many more than three conductors. The windings of the corresponding relays shown in Figs. 1 and 2 are connected to the main cathodes of the corresponding selecting tubes.

Assume now that the sender S1 desires to employ a marker to aid in the establishment of a telephone connection in telephone switching systems as described in greater detail in United States Patent 2,089,921 granted to Carpenter August 10, 1937 and in an application for United States Letters Patent, Serial No. 57,394, filed August 29, 1948 by Busch which patent and application are hereby made a part of the present application as if fully set forth and included herein.

When the sender S1 needs the services of the marker relay 10 will be operated by the sender and apply a voltage of the order of 100 volts through both operated contacts of relay 10 to the control gap anodes of all of the tubes 111, 131, 151, 191, etc., of the first horizontal row of switching and control circuits. This potential is supplied through delay networks 5 and 6 which in the exemplary embodiment of the invention as set forth herein comprises resistances and condensers. The time constants of these networks may be the same or may be different. These time constants of these networks may be varied under control of some of the conditions of the switching arrangement as shown in Fig. 1 when desired.

Assume, for example, that the time constant of network 5 is less than the time constant of network 6 at least at the time relay 10 is operated. Consequently, the condenser of network 5 will become charged to the discharge initiating voltage for tubes 111, 131, etc., before the condenser of network 5 becomes so charged. As a result the tubes 111, 131, etc., will have a preference and will usually have a discharge initiated through them first. When desired the time constants of networks 5 and 6 may be controlled by the number of busy paths or the number of idle paths, in either the first or second group of tubes.

As shown in Fig. 1 the pairs of tubes are divided into groups. It is to be understood, of course, that the pairs of tubes of any row may be divided into any desired number of subgroups and that any desired number of pairs of tubes may be included in each of the subgroups.

Under some conditions a discharge may occur between the control gap elements of two tubes in the first tube of two or more pairs in one or more of the subgroups of the first row, such as in tubes 111 and 131, for example, or between the first tube of two or more of the pairs of tubes in the second group such as tubes 151 or 191 or between the first tube of a pair of tubes in each of the different subgroups such as between the control gap elements of tubes 111 and 151. However, inasmuch as the control gap cathodes of all of the tubes are normally connected to negative battery through relay contacts and the common lock-out impedance network comprising resistance 100 and inductance 101 which connections provide substantially no impedance individual to the various cathodes and inasmuch as the control gap anodes of each of the tubes as shown in Fig. 1 are connected together in circuits which provide substantially no individual impedance while networks 5 and 6 provide common impedance; the probability of a discharge being initiated between more than one control gap of the first tube of the pairs of tubes in any subgroup of the first row is remote. However, discharges may be initiated across the control gaps of a tube in each of the subgroups if the time constants of the delay networks are substantially the same.

After a discharge has been initiated between the control elements of at least one of the tubes in the first row it is essential that a discharge be next initiated or transferred to a path between the control gap cathode and remain at the upper anode of these tubes. The circuits of these elements comprise substantially no individual impedance and include only the common lock-out impedance 100 and 101 as well as the impedance element 102, of the main gap anodes of the first tube of each of the pairs of tubes of the first row. These common impedance elements together with the characteristics of the cold cathode gas discharge tube which permit discharge to be initiated are transferred to a path between the control gap cathode and the main anode in one tube. This discharge causes voltage drops across the common impedance elements which effectively prevent discharges from being initiated or transferred between these two elements of any of the other tubes of the first row of tubes.

Such lock-out circuits are described in greater detail in United States Patents 2,326,551 granted to Mohr on August 10, 1943, and 2,350,888 granted to Hall on June 10, 1944.

Assume now for purposes of illustration that discharge is initiated across the control gap of tube 151 and that this discharge then transfers to a path between the control gap cathode and the main anode. As a result the discharge will not be initiated between the control gap cathode of the main anode in any of the other tubes of the first row even though a discharge may have been initiated between the control gap anode and control gap cathode of such other tubes.

Upon the initiation of a discharge between the control gap cathode and the main anode the discharge within tube 151 is then transferred immediately to a path between the main gap of the tube and as a result voltage drop occurs across the resistor or impedance device 103 which applies a discharge initiating potential to the control gap anode of the second tube 152 of the pair. The control gap cathode of this tube is connected in parallel with the other control gap cathodes of the second tubes of each of the pairs of tubes in a third column of tubes from the left as shown in Fig. 1. As a result a discharge is initiated across the control gap of tube 152 at this time. This discharge then transfers to the main anode and control cathode. This path is likewise provided with only common impedance elements comprising the winding of relay R15 connected to the main anodes of all of the second tubes of each pair of tubes in the third column and the control gap cathodes are connected in parallel to the common lock-out impedance elements 95. Consequently, this discharge can be transferred in only one tube of this column at this time. Thereafter the discharge transfers across the main gap of tube 152 completing a circuit for the operation of relays 15 and R15. Relay 15 in operating connects ground to the control gap anodes of all of the first tubes of each of the pairs of tubes of the first row thus extinguishing any discharges which may exist across these elements.

The operation of relay 15 in addition as shown in Fig. 3 connects the cables CS1 to the cable CM5 thus establishing a connection between the first sender and the fifth marker. During the connection relay 15 is maintained operated by current flowing across the main gap of tube 152. It should be noted that this current flows even though the voltage across the control gap of tube 152 is reduced below the sustaining value for a discharge across this gap of the tube as a result of the extinguishing of the discharge through the tube 151.

The operation of relay R15 in series with relay 15 removes the ground from the cathode of all of the first tubes of the fifth column of pairs of tubes thus preventing any further discharges through these tubes so long as relay 15 remains operated and a discharge flows through tube 152 and relays 15 and R15. Operation of relay R15 also interrupts the circuit through the main gap of the first tube of each pair thus extinguishing the discharge across this tube since the voltage between the main anode of this tube and either the control gap or main cathode of tube 152 is insufficient to maintain the discharge.

Thus the sender S1 is then connected with the marker M5 and double connection between this sender and more than one marker is prevented by the operation of coordinately arranged lock-out circuits.

Thereafter the circuits remain in the condition described so long as is necessary to interconnect the sender S1 with the marker M5. During this time the relay 15 maintains the start anodes of tubes 11, 131, 151, 191, etc., at substantially ground potential, thus preventing the initiation of a discharge through any of these tubes; likewise, relay R15 in operating removes ground from the main cathode of the tubes 151, 451, 851, etc. which in turn extinguishes or prevents discharges to the main cathodes of these tubes. With the discharges to the main cathodes of these tubes extinguished the cathodes of these tubes are at a low value such that they can not become sufficiently positive to initiate a discharge through these tubes to their main cathodes. Consequently, the voltages across the cathode resistors are reduced sufficiently so that a discharge will not be initiated across the control gap of the second tube of these pairs of tubes and a discharge across the control gap of any of these tubes will be extinguished, thus rendering the tubes in the fifth column associated with the No. 5 marker incapable of altering the circuits.

When the marker has performed its function and conveyed the necessary information to the sender the marker momentarily operates relay R5 which interrupts the circuit from battery through the winding of relay R15, the main discharge path of tube 152 and the winding of relay 15 to ground. As a result, relays 15 and R15 release and restore the circuits to their initial condition, wherein the sender is not connected to any marker. The sender, of course, also removes battery from the networks 5 and 6 so that further discharges are not initiated through any of the tubes until the sender is employed on another call and requires the services of a marker. At this time the circuits respond as described above.

Assume now for the purpose of illustration that the sender No. 5 and sender No. 8 simultaneously require the use of a marker in establishing a connection through a telephone switching system. Assume further that these two senders simultaneously operate the respective relays 40 and 80 and apply battery to the corresponding delay networks. Further assume that the time constants of the networks are at this time adjusted so that the voltage across the networks reaches the discharge initiating voltage at substantially the same time. Further assume that discharges are initiated across the control gaps of tubes 411, 451, 811 and 851 at substantially the same instant of time.

Discharge in tubes 411 and 451 will then attempt to transfer from the path between the control anode and the control cathode to the path between the main anode and the control cathode. However, due to the fact that the control cathodes are all connected together with substantially no individual impedance to the common lock-out network comprising resistor 100 and an inductor 101 and since the main anodes of tubes 411, 451, etc. are connected in parallel to the common impedance or lock-out network 402, a discharge can fully transfer to this path in only one tube of the tubes in the No. 4 row. Assume for the purpose of illustration that a discharge transfers between the main anode and the control cathode in tube 451. At this time, likewise, with respect to tubes 811 and 851, the discharge across the control gaps of these tubes will attempt to make the first transfer to the path between the main anode and the control cathode. Due to the common impedances 802 and 100 and 101 this transfer can take place in only one tube. Assume for purposes of description that this takes place in tube 811.

Under these circumstances the discharges in tubes 451 and 811 will then transfer to their main cathodes and apply discharge initiating voltage to the control anode of the respective tubes 452 and 812. These discharges are then transferred as described above to the main gaps across the respective tubes whereupon relay 45 operates and connects sender 40 to marker M5. Likewise, relay 81 operates and connects sender 8 to marker M1. The establishment of the connection between the senders and markers is substantially the same as described above with reference to the connection of senders 1 to marker M5. Furthermore, at the termination of the connection, relays R1 and R5 are operated and restore the circuits to their initial condition.

Assume now that upon the initiation of a discharge across the control gaps of all of the tubes 411, 451, 811 and 851 the discharge is transferred to the main anode and control gap cathode in tubes 411 and 811. The discharge thereupon is transferred to the main gap of these tubes and applies a discharge initiating condition across the control gap of tube 412 and 812. The discharges through these tubes then attempt to transfer to the path between the control cathodes and the main anodes of these tubes. However, the control gap cathodes are all connected together to the common lock-out impedance 91 and the anodes are all connected together to the winding of relay R10. This winding operates as another lock-out impedance arrangement so that it is possible for the discharge to transfer in only one of the tubes of the first column.

Assume for the purpose of illustration that the discharge transfers to the path between the main anode and the control gap cathode in tube 412 at this time. As a result relay 41 operates and connects senders 4 with marker M1. In addition relay 41 grounds the control gap anodes of all of the tubes in No. 4 row, thus preventing any further discharges in any of these tubes. Relay R10 operates in series with relay 41 and removes the potential from the main cathode of tube 811 and the other corresponding tubes of the first column. As a result, tube 811 is extinguished and the discharge through 812 is extinguished. As a result, the discharge within tube 851 will thereupon transfer to the path between the control cathode and the main anode and then across the main gap of this tube whereupon the discharge is initiated through tube 852 causing the operation of relays 85 and R15 which relays operate in the manner described above to cause the connection of senders 8 to marker M5. Thereafter the circuit is operated as it is described above.

It is thus apparent that if the discharges through the tubes are initiated and transfer within tubes not within the same column or same row, more than one connection may be simultaneously established through the two-way lock-out arrangement. On the other hand, if the discharges are initiated within tubes within the same column or row, the lock-out circuits function so that the relay at only one of the cross-points will be operated, thus establishing a single connection from one sender to one marker. Thereafter tubes associated with another cross-point are operated to establish a connection from another sender to another marker. It is to be noted that under no circumstance will one sender be connected to two or more markers, nor will one marker become connected to two or more senders.

In the modification shown in Fig. 2, an additional multielement gas tube is employed for each row. Thus, as shown in Fig. 2, tube 1 is individual to the first row of tubes, tube 4 in the next row, shown in Fig. 2 and tube 8 individual to the last row, shown in Fig. 2. It is to be understood that a tube similar to tubes 1, 4 and 8 is employed for each of the rows of tubes and thus for each of the sender circuits connected to the exemplary multiple lock-out switching arrangement shown in the drawing. The main cathode of this auxiliary tube such as tube 1, is connected to a contact of relay 11, 13, 15 and 19 as well as other relays in the first row which are not shown in the drawing if such other relays and tubes are provided. The circuits shown in Fig. 2 operate in substantially the same manner as that described with reference to Fig. 1 wherein discharges are initiated in the first tube of the various pairs in the lock-out circuits in the manner described above with reference to Fig. 1. Likewise, the discharge is initiated from the second tube of one of the various pairs in the same manner in the above-described lock-out circuits, which discharge in turn causes the operation of one of the relays 11, 13, 15 and 19 and so forth. Operation of such relays, such as relay 13 for example, instead of operating with a number of contacts to short-circuit or ground the control gap anodes of the first tubes of the pairs of tubes of the first row, connects the cathode of tube 1 to negative battery 201 which in turn causes a discharge to flow from the cathode of tube 1 to the anodes of tube 1 connected to any of the control anodes of tubes 111, 131, 151, 191 and so forth which have a sufficiently positive voltage applied to them to cause a discharge to flow through the respective tubes. The discharge flowing through tube 1 between the cathode and the various anodes reduces the voltage of these anodes and thus the voltage on the control gap anodes of the respective tubes 111, 131, 151, 191, etc., below the sustaining voltage of these tubes thus extinguishing all the discharges between the control anodes of any of these tubes. In addition, so long as relay 13 remains operated, and relay 10 likewise operated, the discharge will be maintained through tube 1 thus preventing any discharges between the control gaps of any of the tubes 111, 131, 151 or 191. Consequently, no discharge will take place to the main cathode through any of these tubes with the result that discharges will not be initiated across the electrode of any of the tubes 112, 132, 152 or 192 and any discharge to anodes of these tubes which may have been established prior to the operation of relay 13 will be extinguished so that with the exception of the marker associated with the second column shown in Fig. 2, the other markers will be free for association with other senders in the manner described above.

It is to be noted that by providing this additional tube, the number of contacts on the switching or cross-point relays such as 11, 13, 15, 19 and so forth, is reduced to a single set of contacts in addition to those needed to interconnect a sender and a marker. The closure of these contacts initiates a discharge through the auxiliary tube which discharge then effectively prevents further discharges through the first row of tubes 111, 131, 151, 191, etc. Thus, in a large switching system, the number of contacts of this relay is greatly reduced so that an additional repeating relay is not required. In addition, the current drain through the tube required to operate the relay is also reduced with the resultant improvement in the tube life and economy of operation. Furthermore, by reducing the number of contacts on the relay, speed of operation of the complete switching arrangement is increased thus providing more rapid service.

The foregoing description of an exemplary embodiment of the invention and a modification thereof merely illustrate typical arrangements in embodying lock-out circuits in accordance with this invention. It is to be understood that there are many different modifications and other arrangements adapting the invention for use with other systems and circuits, which modifications and arrangements do not depart from the spirit and scope of the invention.

What is claimed is:

1. In combination, a plurality of cold cathode gaseous conduction tubes arranged in a coordinate array with two interconnected tubes at each cross-point, a lock-out circuit connected to one of the two tubes of each cross-point for each row or column or coordinate of said array and responsive to a discharge through one of said tubes for preventing discharges through other tubes in said row or column or coordinate, a second lock-out circuit interconnected with the second tube of said cross-point and with other second tubes of other cross-points arranged in another coordinate of said array and responsive to a discharge through one of said second tubes for preventing discharges through other tubes in said other coordinate.

2. In combination, a two-way lock-out arrangement comprising a plurality of cold cathode gas conduction tubes arranged in pairs, a control circuit interconnecting the tubes of each of said pairs of tubes, a lock-out circuit interconnected with one of the tubes of a plurality of said pairs of tubes responsive to a discharge through one of the tubes of said pairs of tubes for preventing discharges through tubes of other pairs of said tubes, another lock-out circuit interconnected with a plurality of the other tubes of said pairs of tubes responsive to discharges through one of the tubes of said pairs of tubes for preventing discharges through tubes of other pairs of said tubes.

3. In combination, a two-way lock-out arrangement comprising a plurality of cold cathode gas conduction tubes arranged in pairs, circuits interconnecting each of the tubes of said pairs of tubes, a lock-out circuit interconnected with one of the tubes of a plurality of said pairs of tubes responsive to a discharge through one of said tubes for preventing a discharge through corresponding tubes of other of said pairs of tubes, another lock-out circuit interconnected with a plurality of the other tubes of said pairs of tubes responsive to a discharge through one of said other tubes of one of said pairs of tubes for preventing a discharge through corresponding tubes of other pairs of said tubes, means responsive to a discharge between predetermined elements of the first tube of a pair for applying discharge initiating conditions to the second tube of the pair of tubes.

4. In combination, a first group of circuits, a second group of circuits, a two-way lock-out arrangement comprising a plurality of cold cathode gas conduction tubes arranged in pairs, a lock-out circuit interconnected with one of the tubes of a plurality of said pairs of tubes responsive to a discharge through one of said tubes for preventing a discharge through the corresponding tubes of the other pairs of said tubes connected to said lock-out circuit, another lock-out circuit interconnected with the other tubes of a different plurality of pairs of tubes, means responsive to a discharge between predetermined elements of the first tube of a pair for applying discharge initiating conditions to the second tube of the pair of tubes, switching means responsive to discharge through said second tube for establishing a connection between a circuit of the first group and a circuit of the second group.

5. In combination a first group of circuits, a second group of circuits, a plurality of relays, connections between said relays and circuits for establishing a path between any one of said first group of circuits and any one of said second group of circuits in response to the operation of said relays, a pair of gas discharge tubes individual to each of said relays, interconnections between said relays and said tubes for operating the relay individual to said pair of tubes in response to a discharge through one tube of said pairs of tubes, connections for initiating discharges through one of the tubes of a plurality of said pairs of tubes under control of the circuits of one of said groups of circuits, means responsive to the initiation of a discharge through one tube of a pair to initiate a discharge through the other tube of said pair, a lock-out circuit interconnected with the first tubes of pairs of tubes individual to relays for establishing paths to said one of the circuits of said first group of circuits and operative in response to a discharge through one of said tubes interconnected therewith for preventing discharges through the other tubes interconnected with said lock-out circuit, another lock-out circuit interconnecting with the second tubes of the pairs of tubes individual to relays for establishing paths to one of the circuits of the second group operative in response to a discharge through one of said second tubes of the pairs of tubes connected to said other lock-out circuit for preventing discharges through the second tubes of said pairs of tubes connected to said other lock-out circuit.

6. In combination a first group of circuits, a second group of circuits, a plurality of relays, connections between said relays and circuits for establishing a path between any one of said first group of circuits and any one of said second group of circuits in response to the operation of said relays, a pair of gas discharge tubes individual to each of said relays, circuits interconnecting a pair of gas-discharge tubes and a relay to which they are individual for operating said relay in response to a discharge through a predetermined one of said tubes of said pairs of tubes, connections for initiating discharges through one of the tubes of a plurality of said pairs of tubes under control of the circuits of one of said groups of circuits, means responsive to the initiation of a discharge through one tube of a pair to initiate a discharge through the other tube of said pair, lock-out circuits interconnected with the first tubes of a plurality of pairs of tubes individual to relays for establishing paths to said one of the circuits of said first group of circuits responsive to a discharge through one of said first tubes for preventing discharges through the first tube of other pairs of tubes connected to said lock-out circuit, other lock-out circuits interconnected with the second tubes of a different plurality of pairs of tubes individual to relays for establishing paths to one of the circuits of the second group responsive to a discharge through one of said second tubes for preventing discharges through the second tube of other pairs of tubes connected to said lock-out circuit, a discharge tube individual to each of the circuits of one group for preventing discharges in one of the tubes of said pairs of tubes individual to relays for establishing paths to the circuits of said one group of circuits.

GEORGE HECHT.

REFERENCES CITED

The following references are of record in the file of this patent:

UNITED STATES PATENTS

| Number | Name | Date |
|---|---|---|
| 2,023,589 | Hersey | Dec. 10, 1935 |
| 2,291,752 | Parker | Aug. 4, 1942 |
| 2,326,551 | Mohr | Aug. 10, 1943 |
| 2,350,888 | Hall | June 6, 1944 |